United States Patent
Oh et al.

(10) Patent No.: US 12,164,376 B2
(45) Date of Patent: Dec. 10, 2024

(54) STORAGE DEVICE INCLUDING MAPPING MEMORY AND METHOD OF OPERATING THE SAME

(71) Applicant: Samsung Electronics Co., Ltd., Suwon-si (KR)

(72) Inventors: Eunhye Oh, Suwon-si (KR); Taewook Park, Suwon-si (KR); Jisu Kang, Suwon-si (KR); Yongki Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 8 days.

(21) Appl. No.: 18/148,061

(22) Filed: Dec. 29, 2022

(65) Prior Publication Data

US 2023/0214297 A1 Jul. 6, 2023

(30) Foreign Application Priority Data

Jan. 3, 2022 (KR) .................. 10-2022-0000398
May 25, 2022 (KR) .................. 10-2022-0064241

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01); *G06F 11/1004* (2013.01)

(58) Field of Classification Search
CPC .............. G06F 11/1004; G06F 11/076; G06F 11/1048; G06F 11/1068; G06F 11/0766; G06F 11/073; G11C 29/42; G11C 29/52
See application file for complete search history.

(56) References Cited

U.S. PATENT DOCUMENTS 6,662,333 B1  12/2003  Zhang et al.
8,448,050 B2  5/2013  Sakaue et al.
(Continued)

FOREIGN PATENT DOCUMENTS

JP  4925301 B2  4/2012
JP  4953648 B2  6/2012
WO  WO-2020-055616 A1  3/2020

OTHER PUBLICATIONS

European Search Report dated May 22, 2023 for corresponding EP Patent Application No. 23150146.1.

*Primary Examiner* — Shelly A Chase
(74) *Attorney, Agent, or Firm* — Harness, Dickey & Pierce, P.L.C.

(57) ABSTRACT

Provided is a storage device including a memory device configured to store original data; and a controller configured to control the memory device, the controller including a first error correction circuit configured to correct an error of the original data, and a second error correction circuit configured to correct an error of the original data, a maximum number of correctable error bits of the second error correction circuit being greater than a maximum number of correctable error bits of the first error correction circuit, a mapping memory configured to store at least some of parity bits generated by the second error correction circuit and store an address of the memory device at which the original data is stored; and a control block configured to control the first error correction circuit, the second error correction circuit, and the mapping memory.

18 Claims, 17 Drawing Sheets

(56) References Cited

U.S. PATENT DOCUMENTS

| | | | |
|---|---|---|---|
| 8,775,905 B2 | 7/2014 | Nakanishi | |
| 9,136,872 B2 | 9/2015 | Oh et al. | |
| 9,201,725 B2 | 12/2015 | Yun | |
| 10,115,446 B1 | 10/2018 | Louie et al. | |
| 10,297,304 B1 | 5/2019 | Lee et al. | |
| 10,734,091 B2 | 8/2020 | Takahashi | |
| 11,550,659 B2* | 1/2023 | Kim | G06F 21/602 |
| 2012/0072798 A1 | 3/2012 | Unesaki et al. | |
| 2013/0179748 A1* | 7/2013 | Dong | G06F 11/1012 |
| | | | 714/755 |
| 2016/0110252 A1 | 4/2016 | Hyun et al. | |
| 2016/0196179 A1 | 7/2016 | Zhao et al. | |
| 2016/0342469 A1 | 11/2016 | Healy et al. | |
| 2020/0201707 A1* | 6/2020 | Lee | G06F 3/0604 |
| 2021/0208967 A1 | 7/2021 | Cha et al. | |
| 2021/0334033 A1* | 10/2021 | Cho | G11C 29/10 |
| 2022/0293205 A1 | 9/2022 | Oh et al. | |

\* cited by examiner

STORAGE DEVICE INCLUDING MAPPING MEMORY AND METHOD OF OPERATING THE SAME

CROSS-REFERENCE TO RELATED APPLICATIONS

This application is based on and claims priority under 35 U.S.C. § 119.0 Korean Patent Application Nos. 10-2022-0000398, filed on Jan. 3, 2022, and 10-2022-0064241, field on May 25, 2022, in the Korean Intellectual Property Office, the disclosures of which are incorporated by reference herein in their entireties.

BACKGROUND

The inventive concepts relate to storage devices, and more particularly, to storage devices including a mapping memory and methods of operating the same.

Due to the recent increase in the degree of integration of semiconductor devices, an error correction circuit (ECC) is embedded in a semiconductor device as a method of preventing malfunction of memory cells and improving the reliability of the semiconductor device.

To improve the reliability of a semiconductor device, a write error rate (WER) regarding memory cells may be checked and improved during the manufacturing stage of the semiconductor device. However, it is demanded to further improve the reliability of the semiconductor device by checking and improving the WER even after the manufacturing stage.

SUMMARY

The inventive concepts provide storage devices that include a mapping memory to improve a write error rate (WER) after the manufacturing stage.

The inventive concepts also provide storage devices in which parity bits are stored by utilizing both a mapping memory and a memory device for reduced cost.

The technical goals of the inventive concepts are not limited to the technical goals mentioned above, and other technical goals not mentioned will be clearly understood by one or ordinary skill in the art from descriptions below.

According to the inventive concepts, there is provided a storage device including a memory device configured to store original data; and a controller configured to control the memory device, the controller including a first error correction circuit configured to correct an error of the original data, a second error correction circuit configured to correct an error of the original data, a maximum number of correctable error bits of the second error correction circuit being greater than a maximum number of correctable error bits of the first error correction circuit, a mapping memory configured to store at least some of parity bits generated by the second error correction circuit and store an address of the memory device at which the original data is stored; and a control block configured to control the first error correction circuit, the second error correction circuit, and the mapping memory.

According to the inventive concepts, there is provided a storage device including a memory device configured to store a codeword including original data and parity bits for the original data; and an error correction circuit module configured to generate the codeword by encoding the original data, wherein the error correction circuit module includes a first error correction circuit, a second error correction circuit having a greater maximum number of correctable error bits than the first error correction circuit; and a mapping memory configured to store a part of the codeword generated by the second error correction circuit and an address of the memory device at which the original data is stored.

According to the inventive concepts, there is provided a method of operating a storage device, the method including receiving a write request and original data from outside the storage device, the storage device including a memory device, checking whether an address corresponding to the write request is identical to an address stored in a mapping memory, generating parity bits by performing error correction encoding on the original data by using a first error correction circuit, based on the address corresponding to the write request being different from the address stored in the mapping memory, storing the original data and the parity bits generated by the first error correction circuit in the memory device, when the address corresponding to the write request is identical to the address stored in the mapping memory, generating parity bits by performing error correction encoding on the original data by using a second error correction circuit; and storing the original data and some of the parity bits generated by the second error correction circuit in the memory device and storing the address and remaining of the parity bits generated by the second error correction circuit in the mapping memory, wherein a maximum number of correctable error bits of the second error correction circuit is greater than that of the first error correction circuit.

According to the inventive concepts, there is provided a storage device including a memory device; and a controller configured to control the memory device, wherein the controller includes an error correction circuit configured to correct an error of data, a mapping memory configured to store at least some of parity bits generated by the error correction circuit and store an address of the memory device at which the data is stored; and a control block configured to write original data in the memory device in response to a write request, read data stored in the memory device, and control the error correction circuit based on a result of comparing read data with the original data.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Figure 1:
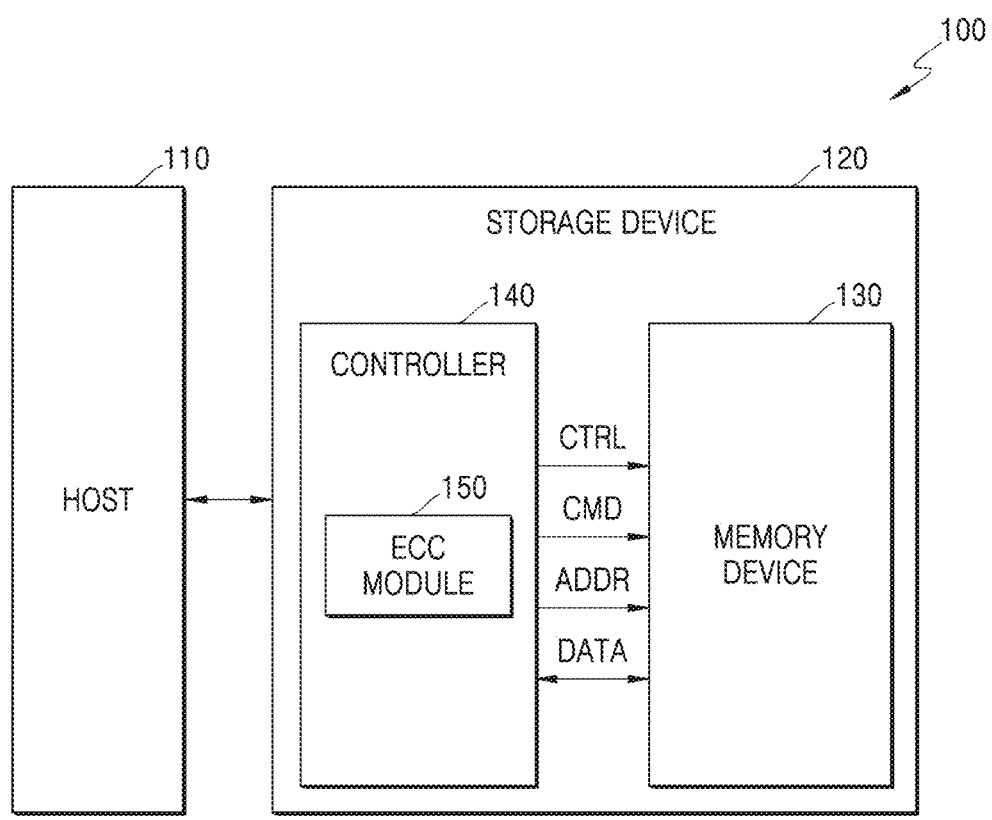
FIG. 1 is a block diagram of a memory system according to embodiment.

FIG. 1 is a block diagram illustrating a memory system according to embodiments.

Referring to FIG. 1, a memory system 100 may include a host 110 and a storage device 120.

In some example embodiments, the memory system 100 may be a data center including dozens of host machines or servers for performing hundreds of virtual machines. For example, the memory system 100 may be a computing device like a laptop computer, a desktop computer, a server computer, a workstation, a portable communication terminal, a personal digital assistant (PDA), a portable multimedia player (PMP), or a smartphone, a virtual machine, or a virtual computing device thereof. Alternatively, the memory system 100 may be one of the components included in a computing system, e.g., a graphics card. The memory system 100 is not limited to the hardware configuration described below and may be configured differently.

The host 110 may refer to a data processing device capable of processing data. The host 110 may execute an operating system (OS) and/or various applications. The host 110 may include a central processing unit (CPU), a graphics processing unit (GPU), a neural processing unit (NPU), a digital signal processor (DSP), a microprocessor, an application processor (AP), etc. In some example embodiments, the memory system 100 may be included in a mobile device, and the host 110 may be implemented as an AP. In some example embodiments, the host 110 may be implemented as a system-on-a-chip (SoC), and thus, the host 110 may be embedded in the memory system 100. The host 110 may include one or more processors. For example, the host 110 may include a multi-core processor.

The host 110 may be configured to execute instructions, software, firmware, or pieces of combinations thereof that may be executed by one or more machines. The host 110 may control a data processing operation for the storage device 120.

The host 110 may communicate with the storage device 120 by using various protocols. For example, the host 110 may communicate with the storage device 120 by using an interface protocol like Peripheral Component Interconnect-Express (PCI-E), Advanced Technology Attachment (ATA), Serial ATA (SATA), parallel ATA (PATA), or Serial Attached SCSI (SAS). Furthermore, various other interface protocols like Universal Flash Storage (UFS), Universal Serial Bus (USB), Multi-Media Card (MMC), Enhanced Small Disk Interface (ESDI), or Integrated Drive Electronics (IDE) may be applied to the protocol between the host 110 and the storage device 120.

In some example embodiments, the storage device 120 may be an internal memory embedded in an electronic device. For example, the storage device 120 may be a solid-state drive or solid-state disk (SSD), a UFS, a memory card, a micro SD card, or an embedded multi-media card (cMMC). In some example embodiments, the storage device 120 may also be an external memory detachable from an electronic device. For example, the storage device 120 may be a UFS memory card, a compact flash (CF) card, a secure digital (SD) card, a micro secure digital (SD) card, a mini secure digital (SD) card, an extreme digital (xD) card, a memory stick, etc.

The storage device 120 may include a memory device 130 and a controller 140. The memory device 130 may store data or read data under control by the controller 140. Although FIG. 1 shows that the storage device 120 includes one memory device 130, the inventive concepts are not limited thereto, and the storage device 120 may include a plurality of memory devices.

The memory device 130 may include various types of memories. For example, the memory device 130 may include a non-volatile memory like electrically erasable/programmable read-only memory (EEPROM), a flash memory, phase change random access memory (PRAM), resistance random access memory (RRAM), nano floating gate memory (NFGM), polymer random access memory (PoRAM), magnetic random access memory (MRAM), and ferroelectric random access memory (FRAM) or a volatile memory like dynamic random access memory (DRAM), static random access memory (SRAM), mobile DRAM, double data rate (DDR) synchronous dynamic random access memory (SDRAM), low power DDR (LPDDR) SDRAM, graphic DDR (GDDR) SDRAM, and Rambus dynamic random access memory (RDRAM). In some example embodiments, descriptions are given with respect to a case where the memory device 130 is MRAM, but the inventive concepts are not limited thereto. Although not shown, the memory device 130 may include a memory cell array, a write/read circuit, and control logic. For example, when the memory device 130 is a resistive memory device, the memory cell array may include resistive memory cells.

The controller 140 may control the overall operation of the storage device 120. The controller 140 may execute firmware when power is applied to the storage device 120. The controller 140 may control the memory device 130 to read data (DATA) stored in the memory device 130 or write data to the memory device 130 according to a request from the host 110. In detail, the memory controller 140 may provide an address ADDR, a command CMD, and a control signal CTRL to the memory device 130, thereby controlling a write operation, a read operation, and an erase operation for the memory device 130. Also, data DATA to be written and read may be transmitted/received between the controller 140 and the memory device 130.

In some example embodiments, the controller 140 may control the memory device 130 to perform an internal management operation of the storage device 120 or a background operation regardless of a request from the host 110. The controller 140 may be implemented by using an SoC, an application specific integrated circuit (ASIC), a field programmable gate array (FPGA), etc.

The controller 140 may include an error correction circuit (ECC) module 150. The error correction circuit module 150 may provide correct data by detecting and correcting an error in data input from the host 110 or data output from the memory device 130. The error correction circuit module 150 may include all circuits, systems, or devices for correcting errors. The error correction circuit module 150 may include at least one error correction circuit.

The error correction circuit module 150 may perform detection and correction of errors in data by using one of a Hamming code, a Reed-Solomon (R-S) code, a Bose-Chaudhuri-Hochquenghem (BCH) code, and a Low-Density Parity-Check (LDPC) code. Operations of the controller 140 and the error correction circuit module 150 are described in more detail below with reference to the following drawings.

Figure 2:
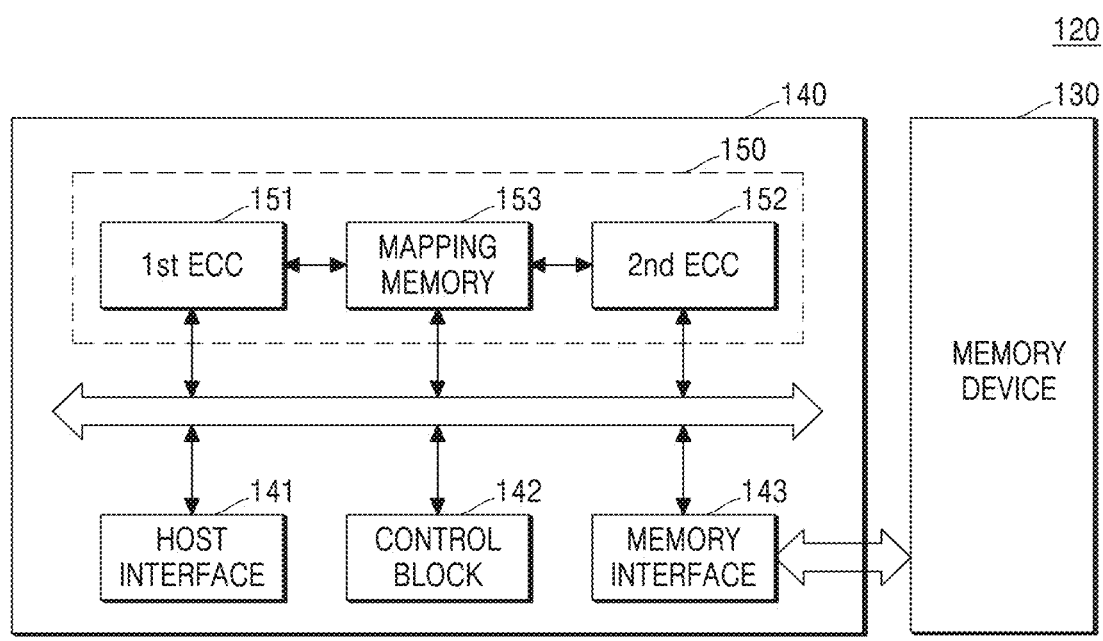
FIG. 2 is a block diagram showing a storage device according to some example embodiments.

FIG. 2 is a block diagram showing a storage device according to some example embodiments. In detail, FIG. 2 is a block diagram for describing an example of the storage device 120 of FIG. 1. Hereinafter, descriptions are given with reference to FIG. 1.

Referring to FIG. 2, the controller 140 may include a host interface 141, a control block 142, a memory interface 143, and the error correction circuit module 150. However, the configuration of the storage device 120 is not limited thereto, and the controller 140 may further include components not shown in FIG. 2.

The host interface 141 may provide a physical connection between a host 110 and the memory device 130. The host interface 141 may transmit a request received from the host 110 to the control block 142. For example, the host interface 141 may receive original data corresponding to a write request from the host 110 or transmit original data corresponding to a read request to the host 110.

Hereinafter, the original data may be data transmitted from the host 110 to the controller 140 through the host interface 141, and transmitted from the controller 140 to the host 110 through the host interface 141.

The host interface 141 may communicate with the host 110 by using various interface protocols. For example, the host interface 141 may communicate with the host 110 by using at least one interface protocol from among Non-Volatile Memory express (NVMe), PCI-E, ATA, SATA, PATA, USB, MMC, ESDI, IDE, Mobile Industry Processor Interface (MIPI), UFS, Small Computer Small Interface (SCSI), and SAS. However, the inventive concepts are not limited thereto.

The control block 142 may control the host interface 141, the memory interface 143, and the error correction circuit module 150. The control block 142 may control the error correction circuit module 150 according to a request of the host 110 and may also control the error correction circuit module 150 regardless of a request of the host 110.

For example, the control block 142 may control the error correction circuit module 150 to correct an error in data stored in the memory device 130 regardless of a request from the host 110. The control block 142 may determine which of at least two error correction circuits included in the error correction circuit module 150 is to be used to perform error correction encoding based on the number of error bits included in data stored in the memory device 130.

For example, the control block 142 may control the error correction circuit module 150 to perform error correction encoding on original data based on a write request received from the host 110 through the host interface 141. The control block 142 may check whether an address corresponding to a write request from the host 110 (hereinafter, referred to as a 'write address') is an address stored in a mapping memory 153 included in the error correction circuit module 150 when a write operation is performed based on the write request. The control block 142 may determine which error correction circuit from among at least two error correction circuits included in the error correction circuit module 150 is to be used to perform error correction encoding according to whether the write address is identical to the address stored in the mapping memory 153.

For example, the control block 142 may control the error correction circuit module 150 to perform error correction decoding on a codeword stored in the memory device 130, based on a read request received from the host 110 through the host interface 141. The control block 142 may check whether an address corresponding to a read request from the host 110 (hereinafter, referred to as a 'read address') is an address stored in the mapping memory 153 included in the error correction circuit module 150 when a read operation is performed based on the read request. The control block 142 may determine which error correction circuit from among at least two error correction circuits included in the error correction circuit module 150 is to be used to perform error correction decoding according to whether the read address is identical to the address stored in the mapping memory 153.

The memory interface 143 may perform communication between the controller 140 and the memory device 130 by using various interface protocols. For example, during a write operation, the memory interface 143 may transmit a write command and a write address output from the control block 142 and a codeword generated by the error correction circuit module 150 to the memory device 130. For example, during a read operation, the memory interface 143 may transmit a read command and a read address output from the control block 142 to the memory device 130 and transmit a codeword stored in the memory device 130 to the error correction circuit module 150.

Hereinafter, the codeword may be a unit that collectively refers to original data input to the storage device 120 and parity bits for the original data or a unit that collectively refers to original data output from the storage device 120 and parity bits for the original data. Therefore, a decoded codeword may refer to original data.

The error correction circuit module 150 may generate a codeword by performing error correction encoding on original data and may generate a decoded codeword (e.g., the original data) by performing error correction decoding on a codeword stored in the memory device 130. The error correction circuit module 150 may have a level of error correction capability. For example, the error correction circuit module 150 may detect and correct an error included in original data when the number of error bits existing in the original data is within the error correction capability. The maximum number of error bits that is within the error correction capability of the error correction circuit module 150 may be referred to as a 'maximum number of correctable error bits'.

The error correction circuit module 150 may include a first error correction circuit (for example, a first ECC) 151, a second error correction circuit (for example, a second ECC) 152, and the mapping memory 153.

Each of the first error correction circuit 151 and the second error correction circuit 152 may generate codewords by performing error correction encoding on original data received through the host interface 141. Each of the first error correction circuit 151 and the second error correction circuit 152 may generate original data by performing error correction decoding on codewords received through a memory interface 143.

The second error correction circuit 152 may have a greater maximum number of correctable error bits than the first error correction circuit 151. For example, the maximum number of correctable error bits of the first error correction circuit 151 may be 2 bits, and the maximum number of correctable error bits of the second error correction circuit 152 may be 3 bits. When the first error correction circuit 151 corrects 2 error bits and detects 3 error bits with respect to 64-bit original data, the first error correction circuit 151 may perform error correction encoding with respect to the 64-bit original data, thereby generating 15 parity bits. When the second error correction circuit 152 corrects 3 error bits and detects 4 error bits with respect to 64-bit original data, the second error correction circuit 152 may perform error correction encoding with respect to the 64-bit original data, thereby generating 21 parity bits. However, it is merely an example for convenience of explanation, and the error correction capabilities of the first error correction circuit 151 and the second error correction circuit 152 are not limited thereto.

The mapping memory 153 may operate under control by the control block 142. The mapping memory 153 may store a write address and at least some of parity bits, which correspond to the write address and are generated by the second error correction circuit 152. For example, the memory device 130 may store some of the parity bits generated by the second error correction circuit 152, and the mapping memory 153 may store the remaining of the parity bits generated by the second error correction circuit 152. In some example embodiments, the mapping memory 153 may store all of the parity bits generated by the second error correction circuit 152 together with a write address. In this case, the memory device 130 may store only original data subjected to error correction encoding by the second error correction circuit 152.

The mapping memory 153 may be a buffer memory. For example, the mapping memory 153 may include SRAM or DRAM, but the inventive concepts are not limited thereto. The mapping memory 153 may at least temporarily store at least some of parity bits generated by the second error correction circuit 152 and its corresponding write address.

Figure 3:
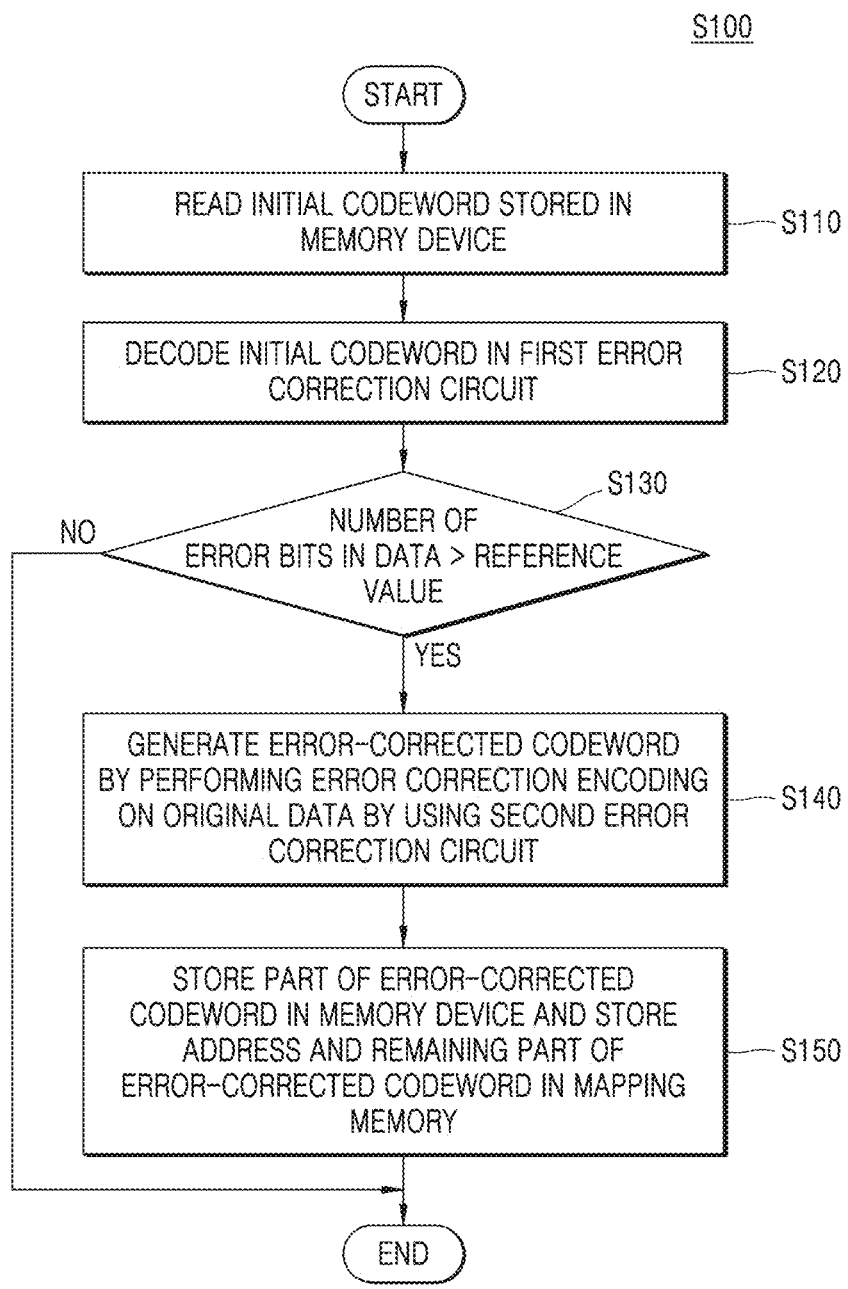
FIG. 3 is a flowchart of a method of operating a controller, according to some example embodiments.

FIG. 3 is a flowchart of a method of operating a controller, according to some example embodiments. In detail, FIG. 3 is a flowchart for describing an operation in which the controller 140 of FIG. 1 corrects an error of original data stored in the memory device 130 regardless of a request from the host 110. Hereinafter, descriptions are given with reference to FIGS. 1 and 2.

In some example embodiments, and as may be seen in FIG. 3, a codeword generated as the error correction circuit module 150 performs error correction encoding on original data again after error correction decoding is performed on an initial codeword stored in the memory device 130 may be referred to as an 'error corrected codeword'. The error corrected codeword may include original data and a plurality of parity bits generated by performing error correction encoding again on the original data. The parity bits included in the error corrected codeword may be different from parity bits included in the initial codeword.

Referring to FIG. 3, a method S100 of operating a controller may include operations S110 to S150. The method S100 of operating a controller may be performed after a write operation in response to a write request from the host 110, as described below with reference to FIG. 5. Therefore, before operation S110, the memory device 130 may store original data received from the host 110 and parity bits regarding the original data. In some example embodiments, and as may be seen in FIG. 3, a codeword including original data on which error correction encoding is initially performed based on a write request of the host 110 and parity bits regarding the original data may be referred to as an 'initial codeword'.

In operation S110, the controller 140 may read an initial codeword stored in the memory device 130 regardless of a request from the host 110. The controller 140 may read all initial codewords stored in the memory device 130 or may read only some of the initial codewords according to a certain rule. The controller 140 may read the initial codeword stored in the memory device 130 regardless of a request from the host 110 and perform operations S120 to S150 to be described below, thereby removing errors that may occur in data stored in the memory device 130 and provide data with improved reliability.

In operation S120, the controller 140 may control the first error correction circuit 151 to perform error correction decoding on the initial codeword. The first error correction circuit 151 may extract the number of error bits by performing error correction decoding on the initial codeword.

In operation S130, the control block 142 may determine whether the number of error bits is greater than a reference value. The reference value may be a value defined by, for example, a user, a designer, or a manufacturer. For example, the reference value may be equal to the maximum number of correctable error bits of the first error correction circuit 151. The control block 142 may select an error correction circuit to perform error correction encoding on the original data based on the number of error bits of the original data. As shown in FIG. 3, when the number of error bits of the original data is equal to or less than the reference value, the method S100 of FIG. 3 may be terminated, and a state in which the initial codeword is stored in the memory device 130 may be maintained. In an embodiment, when the number of error bits of the original data is equal to or less than the reference value, the following operations S160 and S170 (not shown) described with reference to FIG. 4 may be performed.

In operation S140, when the number of error bits of the original data is greater than the reference value, the control block 142 may select the second error correction circuit 152 as an error correction circuit to perform error correction encoding. The second error correction circuit 152 may generate an error corrected codeword by performing error correction encoding.

The number of parity bits generated by the second error correction circuit 152 in operation S140 may be greater than the number of parity bits of the initial codeword. For example, the number of parity bits generated by the second error correction circuit 152 may be 21 bits, and the number of parity bits of the initial codeword may be 15 bits.

In operation S150, the control block 142 may control the mapping memory 153 and the memory device 130, such that a part of the error corrected codeword generated by the second error correction circuit 152 is stored in the memory device 130 and its corresponding address and the remaining of the error corrected codeword are stored in the mapping memory 153. For example, the part of the error corrected codeword stored in the memory device 130 may include original data and some of parity bits generated by the second error correction circuit 152, and the remaining of the error corrected codeword stored in the mapping memory 153 may include the remaining parity bits that are generated by the second error correction circuit 152 and are not stored in the memory device 130. In other words, some of the parity bits generated by the second error correction circuit 152 may be stored in the memory device 130, and the remaining parity bits generated by the second error correction circuit 152 may be stored in the mapping memory 153.

For example, when the parity bits generated by the second error correction circuit 152 include a total of 21 bits, the part of the error corrected codeword stored in the memory device 130 may include the original data and first to fourteenth bits of the parity bits, and the remaining of the error corrected codeword stored in the mapping memory 153 may include fifteenth to twenty-first bits of the parity bits. Therefore, the mapping memory 153 may store the fifteenth to twenty-first bits of the parity bits and an address.

However, example embodiments are not limited thereto, and the part of the error corrected codeword stored in the memory device 130 may include only original data and the remaining of the error corrected codeword stored in the mapping memory 153 may include all of parity bits generated by the second error correction circuit 152. Hereinafter, the method S100 of operating a controller is described in more detail with reference to FIG. 4.

Figure 4:
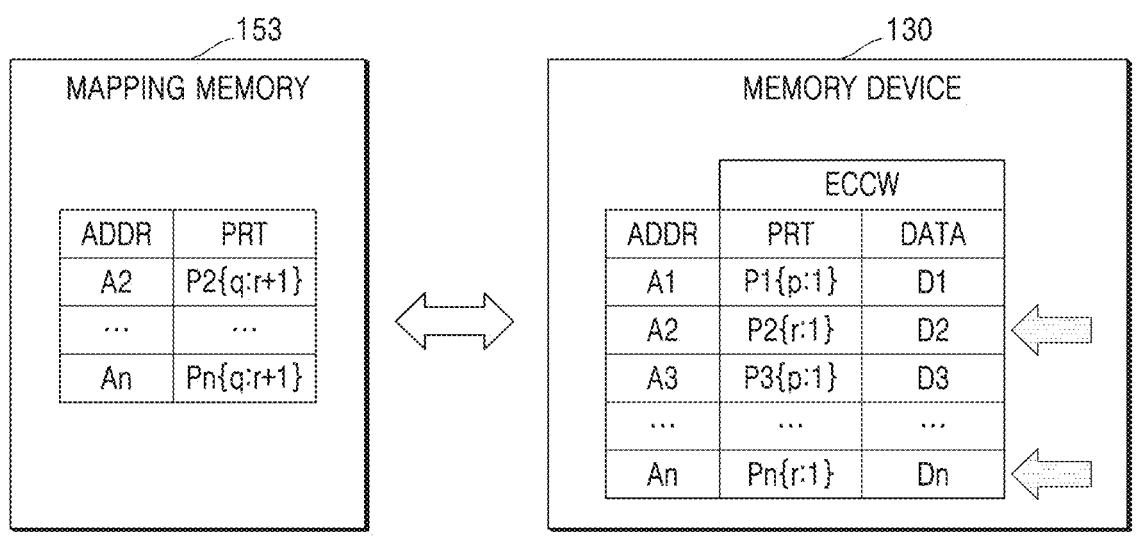
FIG. 4 is a diagram for describing an operation of a controller according to some example embodiments.

FIG. 4 is a diagram for describing an operation of a controller according to some example embodiments. In detail, FIG. 4 is a diagram showing data stored in the mapping memory 153 and the memory device 130 after all of operations S110 to S150 of FIG. 3 are performed. Some of the components of FIGS. 1 and 2 may be omitted in FIG. 4, and FIG. 4 is described with reference to FIGS. 1 to 3.

Referring to FIG. 4, in operation S130 of FIG. 3, the number of error bits of first original data D1 stored at a first address A1 of the memory device 130 may be equal to or less than a reference value. The first error correction circuit 151 may perform error correction encoding on the first original data D1, thereby generating an error corrected codeword ECCW for the first address A1. The error corrected codeword ECCW for the first address A1 may include first parity bits P1 and the first original data D1. The first parity bits P1 may include a total of p bits, and p may be an integer greater than 1. The error corrected codeword ECCW for the first address A1 may include all of first to p-th bits of the first parity bits P1 (that is, P1{p:1}).

The memory device 130 may store the error corrected codeword ECCW for the first address A1. Therefore, the initial codeword stored in the first address A1 is deleted, and the error corrected codeword ECCW newly generated may be stored at the first address A1 of the memory device 130.

In operation S130 of FIG. 3, the number of error bits of second original data D2 stored at a second address A2 of the memory device 130 may be greater than the reference value. In operation S140 of FIG. 3, the second error correction circuit 152 may perform error correction encoding on the second original data D2, thereby generating an error corrected codeword ECCW for the second address A2. The error corrected codeword ECCW for the second address A2 may include second parity bits P2 and the second original data D2. The second parity bits P2 may include a total of q bits, and q may be an integer greater than p.

In operation S150 of FIG. 3, the memory device 130 may store a part of the error corrected codeword ECCW for the second address A2, and the mapping memory 153 may store the remaining of the error corrected codeword ECCW for the second address A2. The part of the error corrected codeword ECCW stored in the memory device 130 may include some of the second parity bits P2 and the second original data D2, and the remaining of the error corrected codeword ECCW stored in the mapping memory 153 may include the remaining of the second parity bits P2 that are not stored in the memory device 130.

For example, the part of the error corrected codeword ECCW stored in the memory device 130 may include first to r-th bits of the second parity bits P2 (that is, P2{r:1}), where r may be an integer greater than 0 and less than q. In this case, the remaining of the error corrected codeword ECCW stored in the mapping memory 153 may include (r+1)-th to q-th bits of the second parity bits P2 (that is, P2{q:r+1}).

The initial codeword stored at the second address A2 of the memory device 130 is deleted, and a part of the error corrected codeword ECCW generated in operation S140 of FIG. 3 may be newly stored at the second address A2 of the memory device 130.

However, the inventive concepts are not limited thereto. The part of the error corrected codeword ECCW stored in the memory device 130 may include only the second original data D2, and in this case, the remaining of the error corrected codeword ECCW stored in the mapping memory 153 may include all of first to q-th bits of the second parity bits P2 for the second address A2. Therefore, the memory device 130 may store only the second original data D2 at the second address A2, and the mapping memory 153 may store both the second address A2 and the second parity bits P2. In some embodiments, an error corrected codeword ECCW corresponding to a third address A3 may include first to p-th bits of third parity bits P3 (that is, P3{p:1}) and third original data D3, and may be newly stored at the third address A3 of the memory device 130. In some embodiments, a part of an error corrected codeword ECCW corresponding to an n-th address An may include first to r-th bits of n-th parity bits Pn (that is, Pn{r:1}) and n-th original data Dn, and may be stored at the n-th address An of the memory device 130; and the remaining of the error corrected codeword ECCW corresponding to the n-th address An may include (r+1)-th to q-th bits of the n-th parity bits Pn (that is, Pn{q:r+1}), and may be stored in the mapping memory 153.

According to some example embodiments, when the number of error bits of original data is greater than the reference value, parity bits for correcting more errors may be generated by using the second error correction circuit 152, thereby reducing a write error rate (WER) for memory cells. Also, since the WER may be managed after the manufacturing stage, the reliability of the storage device 120 may be improved. Also, by storing some of parity bits generated by the second error correction circuit 152 in the mapping memory 153 and storing the remaining parity bits in the memory device 130, memory cells for additional parity bits may not be needed, and the operating cost of the storage device 120 may be reduced.

Figure 5:
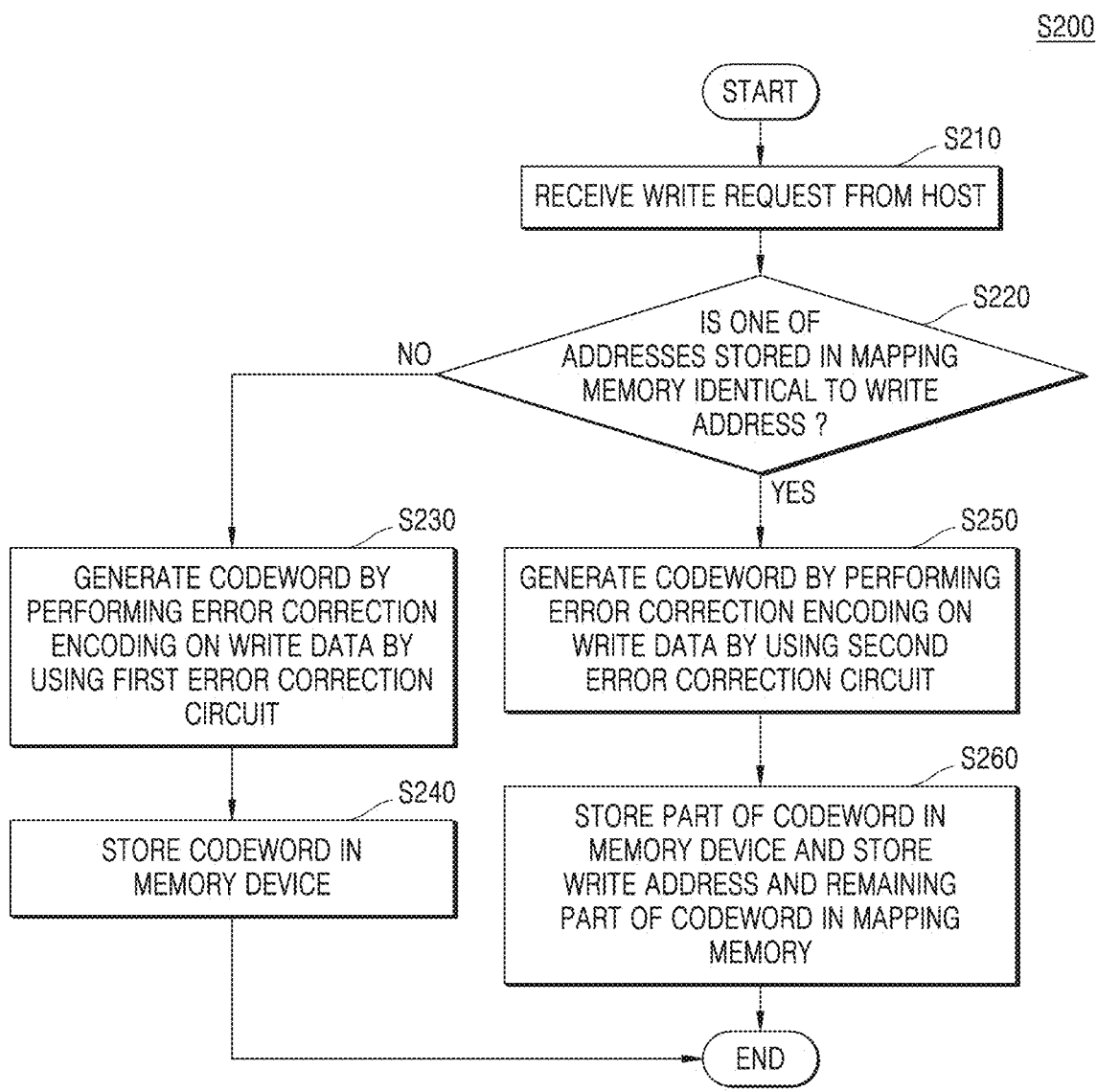
FIG. 5 is a flowchart of a data writing method of a storage device according to some example embodiments.

FIG. 5 is a flowchart of a data writing method of a storage device according to some example embodiments. In detail, FIG. 5 is a flowchart for describing a data write operation performed by the storage device 120 of FIG. 1 in response to a write request from the host 110. Hereinafter, descriptions are given with reference to FIGS. 1 and 2.

Referring to FIG. 5, a data writing method S200 of a storage device may include operations S210 to S260.

In operation S210, the control block 142 may receive a write request and original data from the host 110 through the host interface 141.

In operation S220, the control block 142 may check whether a write address is identical to one of addresses stored in the mapping memory 153. The control block 142 may select an error correction circuit to perform error correction encoding on the original data based on whether the write address is identical to one of addresses stored in the mapping memory 153.

In operation S230, when the write address is not identical to any of addresses stored in the mapping memory 153, the control block 142 may select the first error correction circuit 151 as an error correction circuit to perform error correction encoding on the original data. The first error correction circuit 151 may generate a codeword by performing error correction encoding on the original data. The codeword may be the 'initial codeword' described above with reference to FIG. 3. The initial codeword may include original data and parity bits initially generated for the original data.

In operation S240, the control block 142 may store the codeword in the memory device 130.

In operation S250, when the write address is identical to any of addresses stored in the mapping memory 153, the control block 142 may select the second error correction circuit 152 as an error correction circuit to perform error correction encoding on the original data. The second error correction circuit 152 may generate a codeword by performing error correction encoding on the original data. The codeword may be the 'initial codeword' described above with reference to FIG. 3.

The number of parity bits generated by the second error correction circuit 152 may be greater than the number of parity bits generated by the first error correction circuit 151. For example, the number of parity bits generated by the first error correction circuit 151 may be p bits, whereas the number of parity bits generated by the second error correction circuit 152 may be q bits. Here, p may be an integer greater than 0, and q may be an integer greater than p. Therefore, the size of the initial codeword generated by the second error correction circuit 152 may be larger than the size of the initial codeword generated by the first error correction circuit 151.

In operation S260, the control block 142 may control the memory device 130 and the mapping memory 153, such that a part of the codeword generated in operation S250 is stored in the memory device 130 and an address at which the codeword generated in operation S250 is stored and the remaining of the codeword generated in operation S250 are stored in the mapping memory 153. At this time, data stored at the address at which the codeword generated in operation S250 is to be stored may be deleted. In other words, data stored at the address in the mapping memory 153 and the memory device 130 may be updated with the codeword generated in operation S250.

The part of the codeword stored in the memory device 130 may include original data and some of parity bits, and the remaining of the codeword stored in the mapping memory 153 may include the remaining parity bits that are not stored in the memory device 130.

For example, when the parity bits generated by the second error correction circuit 152 include a total of q bits, the part of the codeword stored in the memory device 130 may include the original data and first to r-th bits of the parity bits, and the remaining of the codeword stored in the mapping memory 153 may include (r+1)-th to q-th bits of the parity bits. Therefore, the mapping memory 153 may store the (r+1)-th to q-th bits of the parity bits and a write address.

However, example embodiments are not limited thereto, and the part of the codeword stored in the memory device 130 may include only original data and the remaining of the codeword stored in the mapping memory 153 may include all of parity bits generated by the second error correction circuit 152.

Figure 6:
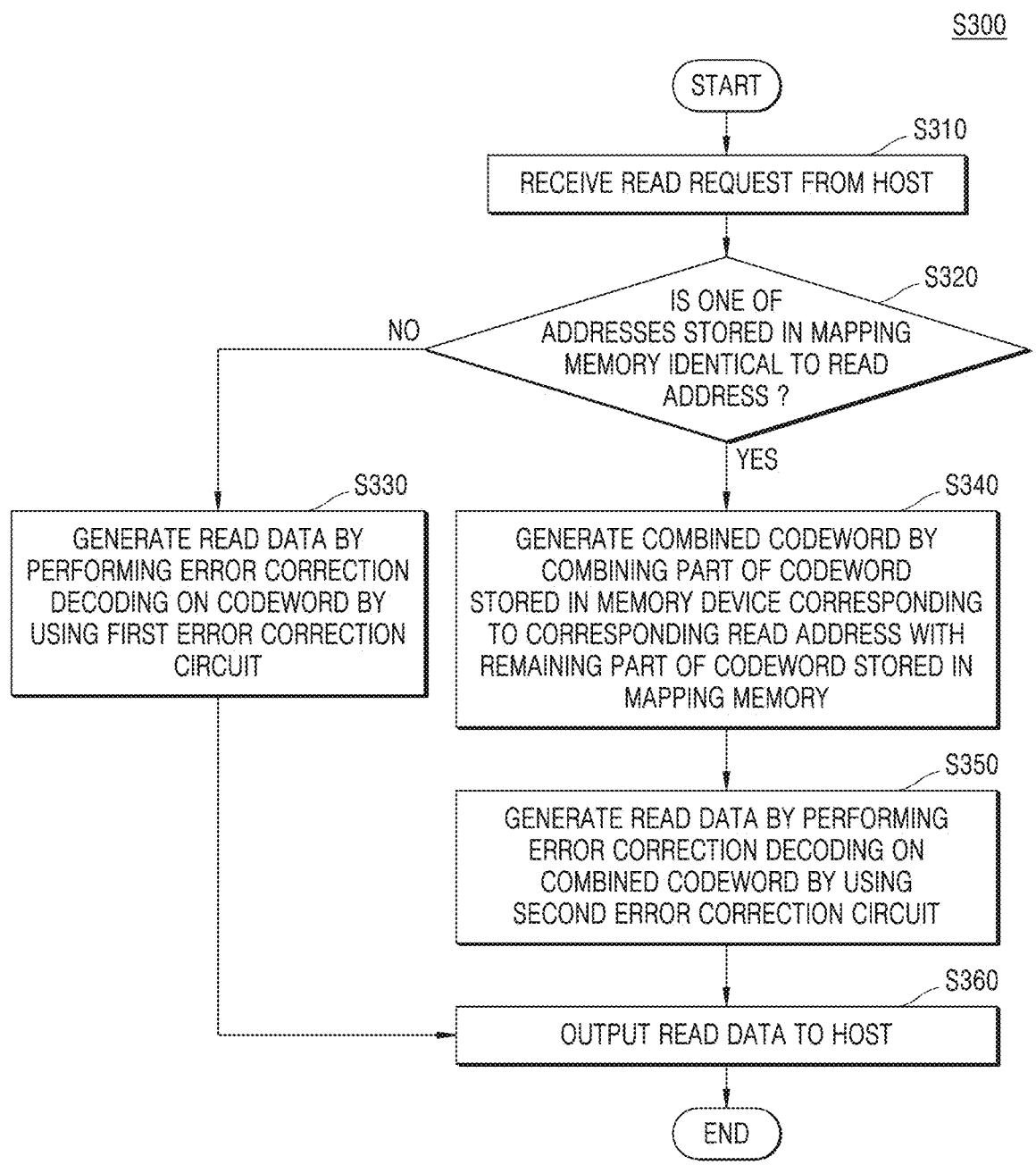
FIG. 6 is a flowchart of a data reading method of a storage device according to some example embodiments.

FIG. 6 is a flowchart of a data reading method of a storage device according to some example embodiments. In detail, FIG. 6 is a flowchart for describing a data read operation performed by the storage device 120 of FIG. 1 in response to a read request from the host 110. Hereinafter, descriptions are given with reference to FIGS. 1 and 2.

Referring to FIG. 6, a data reading method S300 of a storage device may include operations S310 to S360. The data reading method S300 of a storage device may be performed after a write operation in response to a write request from the host 110 described above with reference to FIG. 5. In FIG. 6, a codeword may collectively refer to the initial codeword and the error corrected codeword described above with reference to FIGS. 3 to 5.

In operation S310, the control block 142 may receive a read request from the host 110 through the host interface 141, and, based on the read request, may read a codeword stored in the memory device 130 through the memory interface 143.

In operation S320, the control block 142 may check whether a read address is identical to one of addresses stored in the mapping memory 153. The control block 142 may select an error correction circuit to perform error correction decoding on the codeword read from the memory device 130 according to whether the read addresses is identical to one of addresses stored in the mapping memory 153.

In operation S330, when the read address is not identical (e.g., different) to any of addresses stored in the mapping memory 153, the control block 142 may select the first error correction circuit 151 as an error correction circuit to perform error correction decoding on the codeword read from the memory device 130. The first error correction circuit 151 may generate original data (for example, read data) by performing error correction decoding on the codeword.

In operation S340, when the read address is identical to an address stored in the mapping memory 153, the control block 142 may combine a part of a codeword stored at the read address of the memory device 130 with the remaining of the codeword stored in the mapping memory 153 together with the read address, thereby generating a combined codeword.

For example, the part of the codeword stored in the memory device 130 may include original data and some of parity bits, and the remaining of the codeword stored in the mapping memory 153 may include the remaining parity bits that are not stored in the memory device 130. For example, the part of the codeword stored in the memory device 130 may include the original data and first to r-th bits of the parity bits, and the remaining of the codeword stored in the mapping memory 153 may include (r+1)-th to q-th bits of the parity bits. Therefore, the combined codeword may include the original data and first to q-th bits of the parity bits.

For example, the part of the codeword stored in the memory device 130 may include only the original data, and the remaining of the codeword stored in the mapping memory 153 may include all of the parity bits. Even in this case, the combined codeword may include the original data and first to q-th bits of the parity bits.

The combined codeword may include original data and all of parity bits generated by the second error correction circuit 152. Therefore, the combined codeword may have a larger data size than the codeword on which error correction decoding is performed in operation S330. For example, the number of parity bits included in the combined codeword may be greater than the number of parity bits included in the codeword on which error correction decoding is performed in operation S330.

In operation S350, the control block 142 may select the second error correction circuit 152 as an error correction circuit to perform error correction decoding on the combined codeword. The second error correction circuit 152 may generate original data by performing error correction decoding on the combined codeword.

In operation S360, the control block 142 may output the original data to the host 110 through the host interface 141. The original data may be data on which error detection and correction have been performed by the error correction circuit module 150.

Figure 7:
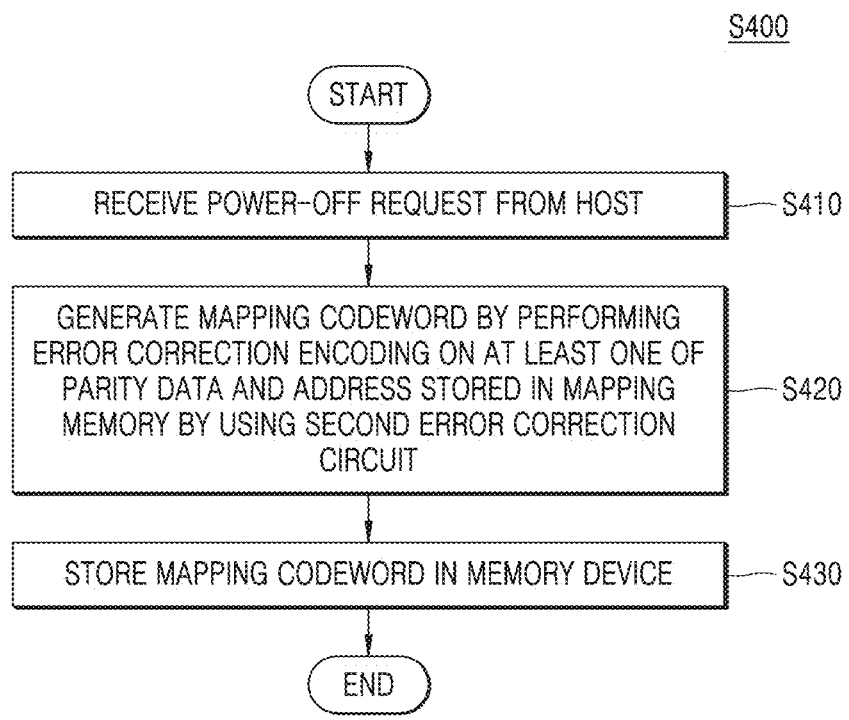
FIG. 7 is a flowchart of a method of operating a controller, according to some example embodiments.

FIG. 7 is a flowchart of a method of operating a controller, according to some example embodiments. In detail, FIG. 7 is a flowchart for describing a method of backing up data stored in the mapping memory 153 when the storage device 120 is powered off. Hereinafter, descriptions are given with reference to FIGS. 1 and 2.

Referring to FIG. 7, a method S400 in which the controller 140 backs up the mapping memory 153 may include operations S410 to S430. The method S400 of backing up a mapping memory may be performed after a write operation in response to a write request from the host 110 described above with reference to FIG. 5.

In operation S410, the control block 142 may receive a power-off request from the host 110 through the host interface 141. Alternatively, the control block 142 may detect a power-off state of the storage device 120.

In operation S420, the control block 142 may control the second error correction circuit 152 to perform error correction encoding on at least one of an address and parity data stored in the mapping memory 153.

The control block 142 may control the second error correction circuit 152 to perform error correction encoding on mapping data. The mapping data may refer to data to be subjected to error correction encoding by the second error correction circuit 152 from among an address and parity bits stored in the mapping memory 153, and mapping parity data may refer to parity bits generated as the second error correction circuit 152 performs error correction encoding on the mapping data. For example, the mapping data may include an address and parity bits stored in the mapping memory 153 or may include only the address stored in the mapping memory 153.

The second error correction circuit 152 may perform error correction encoding on mapping data, thereby generating a mapping codeword including the mapping data and the mapping parity data.

In operation S430, the control block 142 may control the memory device 130 to store the mapping codeword including the mapping data and the mapping parity data. Therefore, the mapping codeword may be stored in the memory device 130. Hereinafter, operations S420 and S430 are described in more detail with reference to FIGS. 8 and 9.

Figure 8:
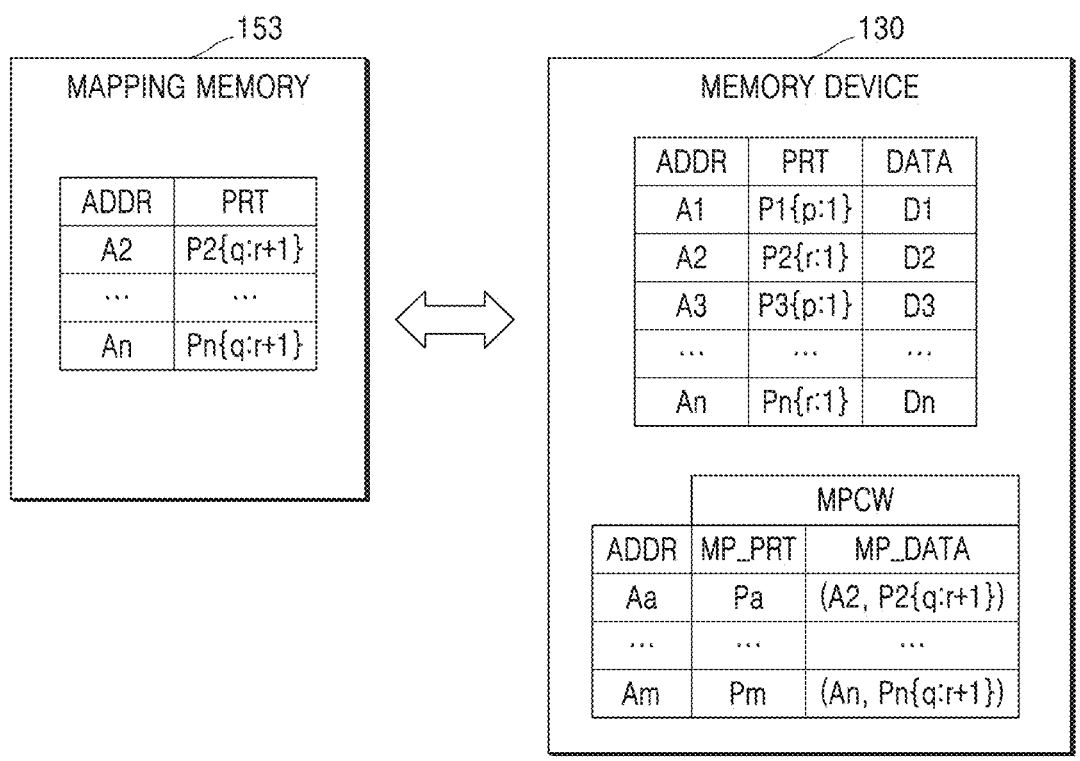
FIG. 8 is a diagram for describing a method of operating a controller, according to some example embodiments.
Figure 9:
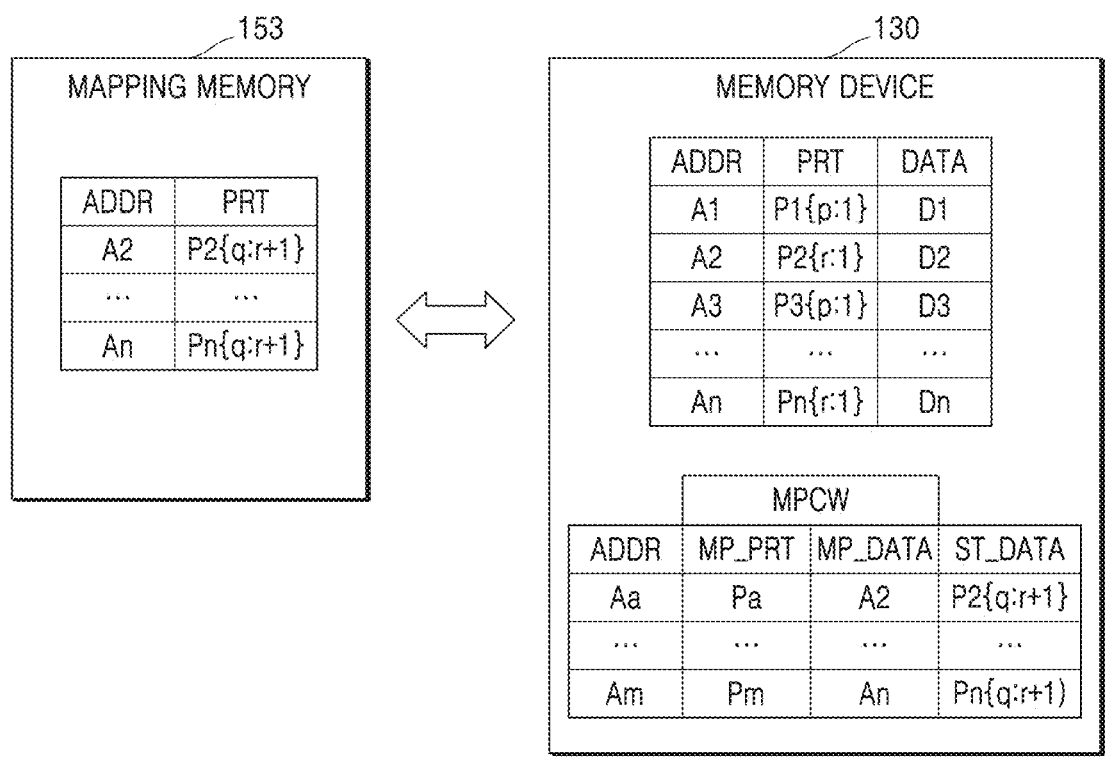
FIG. 9 is a diagram for describing a method of operating a controller, according to some example embodiments.

FIGS. 8 and 9 are diagrams for describing an operation of a controller according to some example embodiments. In detail, FIGS. 8 and 9 are diagrams showing data stored in the mapping memory 153 and the memory device 130 after all of operations S410 to S430 of FIG. 7 are performed. Some of the components of FIGS. 1 and 2 may be omitted in FIGS. 8 and 9, and FIGS. 8 and 9 are described with reference to FIGS. 1 to 5 and 7.

Referring to FIG. 8, in operation S420 of FIG. 7, mapping data MP_DATA may include an address and parity bits stored in the mapping memory 153. For example, the mapping data MP_DATA may include the second address A2 and the parity bits P2{q:r+1} corresponding to the second address A2.

The second error correction circuit 152 may generate a mapping codeword MPCW including the mapping data MP_DATA and the mapping parity data MP_PRT by performing error correction encoding on the mapping data MP_DATA. The mapping parity data MP_PRT may include parity bits for the mapping data MP_DATA.

For example, the second error correction circuit 152 may generate mapping parity data (for example, mapping parity bits Pa) by performing error correction encoding on mapping data including the second address A2 and some parity bits P2{q:r+1} of parity bits corresponding to the second address A2.

In operation S430 of FIG. 7, the memory device 130 may store the mapping codeword MPCW at a third address Aa. Therefore, even when the storage device 120 is powered off, data stored in the mapping memory 153 may be maintained. In some embodiments, a mapping codeword MPCW corresponding to an n-th address An may include mapping parity data MP_PRT (for example, Pm) and mapping data MP_DATA (for example, including the n-th address An and parity bits Pn{q:r+1} corresponding to the n-th address An), and may be stored at an m-th address Am of the memory device 130.

Referring to FIG. 9, in operation S420 of FIG. 7, the mapping data MP_DATA may include an address stored in the mapping memory 153. For example, the mapping data MP_DATA may include the second address A2. The second error correction circuit 152 may generate a mapping codeword MPCW including the mapping data MP_DATA and the mapping parity data MP_PRT by performing error correction encoding on the mapping data MP_DATA.

In operation S430 of FIG. 7, parity bits and the mapping codeword MPCW corresponding to the mapping data MP_DATA stored in the mapping memory 153 may be stored at the third address Aa of the memory device 130.

For example, the parity bits P2{q:r+1} corresponding to the second address A2 (for example, as data ST_DATA) and the mapping codeword MPCW for the second address A2 may be stored at the third address Aa of the memory device 130. Here, the parity bits P2{q:r+1} corresponding to the second address A2 may be stored in the memory device 130 without error correction encoding. In some embodiments, a mapping codeword MPCW corresponding to the n-th address An may include mapping parity data MP_PRT (for example, Pm) and mapping data MP_DATA (for example, the n-th address An), and may be stored at the m-th address Am of the memory device 130 together with parity bits Pn{q:r+1} corresponding to the n-th address An (for example, as data ST_DATA).

According to some example embodiments, as data stored in the mapping memory 153 is stored in the memory device 130 after error correction decoding is performed thereon, the operation of the storage device 120 may be safely performed and high reliability may be provided.

Figure 10:
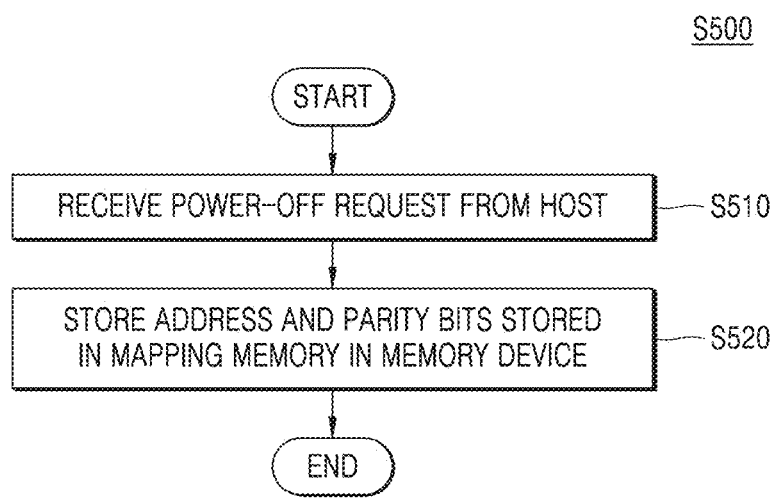
FIG. 10 is a flowchart of a method of operating a controller, according to some example embodiments.

FIG. 10 is a flowchart of a method of operating a controller, according to some example embodiments. In detail, FIG. 10 is a flowchart for describing a method of backing up data stored in the mapping memory 153 when the storage device 120 is powered off. Hereinafter, descriptions are given with reference to FIGS. 1 and 2.

Referring to FIG. 10, a method S500 in which the controller 140 backs up the mapping memory 153 may include operations S510 and S520. The method S500 of backing up a mapping memory may be performed after a write operation in response to a write request from the host 110 described above with reference to FIG. 4.

In operation S510, the control block 142 may receive a power-off request from the host 110 through the host interface 141. Alternatively, the control block 142 may detect a power-off state of the storage device 120.

In operation S520, the control block 142 may store an address and parity bits stored in the mapping memory 153 in the memory device 130. As compared with the embodiments described above with reference to FIGS. 7 to 9, the address and/or the parity bits stored in the mapping memory 153 in the embodiments of FIG. 10 may be stored in the memory device 130 without being encoded by, for example, the second error correction circuit 152. Hereinafter, the flowchart of FIG. 10 will be described in more detail with reference to FIG. 11.

Figure 11:
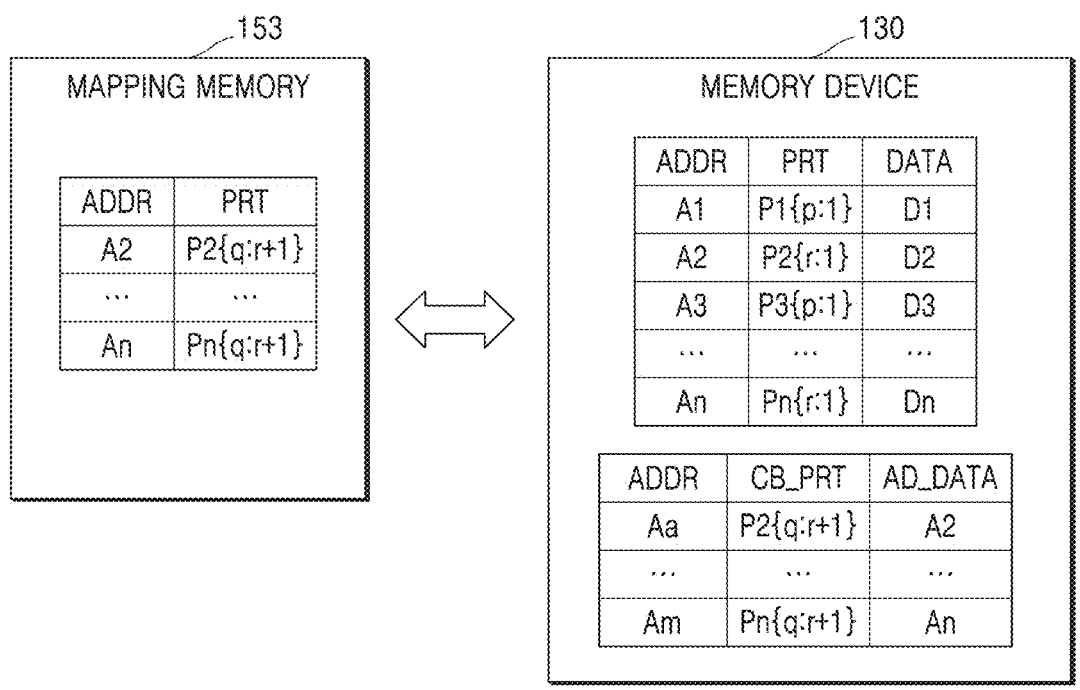
FIG. 11 is a diagram for describing an operation of a controller according to some example embodiments.

FIG. 11 is a diagram for describing an operation of a controller according to some example embodiments. In detail, FIG. 11 is a diagram showing data stored in the mapping memory 153 and the memory device 130 after all of operations S510 and S520 of FIG. 10 are performed. Some of the components of FIGS. 1 and 2 may be omitted in FIG. 11, and FIG. 11 will be described with reference to FIGS. 1 to 5 and 10.

Referring to FIG. 11, in operation S520 of FIG. 10, the control block 142 may store an address and parity bits stored in the mapping memory 153 in the memory device 130. For example, the control block 142 may store the parity bits P2{q:r+1} from (r+1)-th to q-th bits of the second parity bits P2, which are stored in the mapping memory 153 together with the second address A2, in the memory device 130. Therefore, the memory device 130 may store the parity bits P2{q:r+1} from (r+1)-th to q-th bits of the second parity bits P2 (for example, as parity data CB_PRT) at a new first address Aa and may store the second address A2 as address data AD_DATA.

According to some example embodiments, as data stored in the mapping memory 153 is stored in the memory device 130 without performing error correction encoding thereon, the operation speed of the storage device 120 in response to power-off may be improved.

Figure 12:
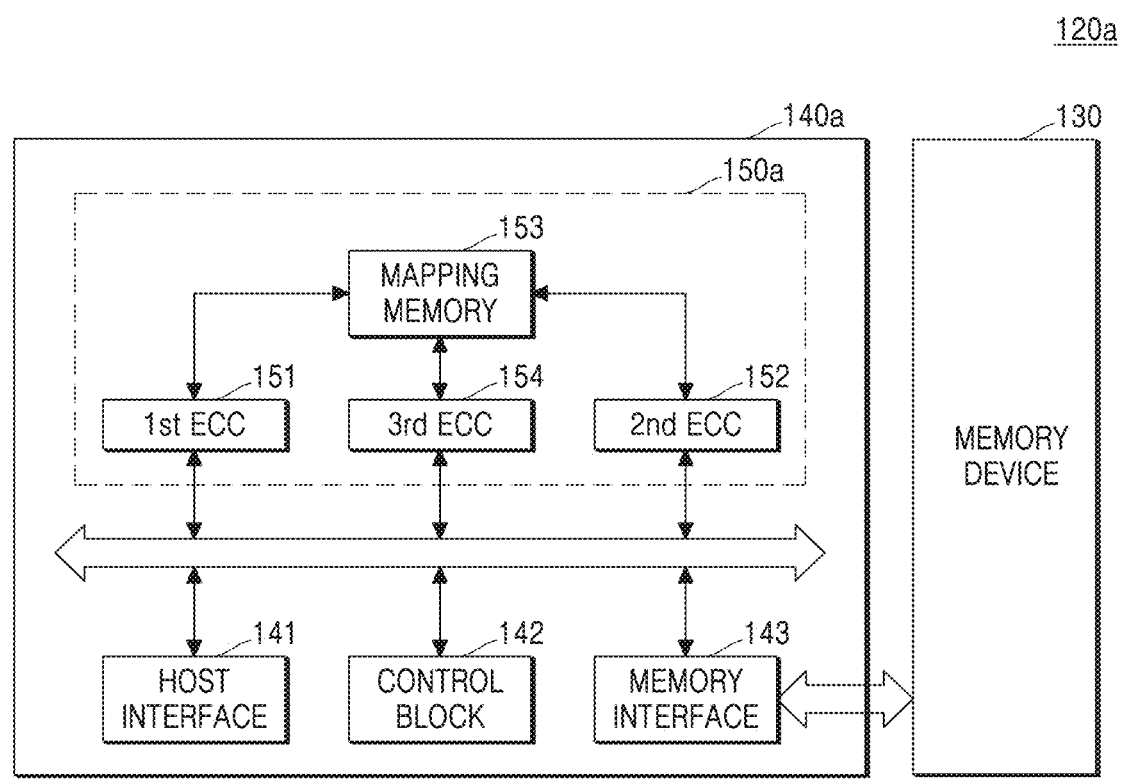
FIG. 12 is a block diagram showing a storage device according to some example embodiments.

FIG. 12 is a block diagram showing a storage device according to some example embodiments. In detail, FIG. 12 is a diagram for describing another example embodiment of the error correction circuit module 150 described above with reference to FIG. 3. Hereinafter, descriptions are given with reference to FIGS. 1 to 3, the same reference numerals may denote the same elements, and redundant descriptions will be omitted.

Referring to FIG. 12, a controller 140a may include the host interface 141, the control block 142, the memory interface 143, and an error correction circuit module 150a. However, the configuration of the controller 140a is not limited thereto, and the controller 140a may further include components not shown in FIG. 12.

The error correction circuit module 150a may include the first error correction circuit 151, the second error correction circuit 152, a third error correction circuit (for example, a third ECC) 154, and the mapping memory 153. As compared to the error correction circuit module 150 of FIG. 3, the error correction circuit module 150a may further include the third error correction circuit 154. For example, the third error correction circuit 154 may correct an error of data stored in the mapping memory 153.

The third error correction circuit 154 may have a greater maximum number of correctable error bits than that of the first error correction circuit 151 and that of the second error correction circuit 152. For example, the maximum number of correctable error bits of the first error correction circuit 151 may be 2 bits, the maximum number of correctable error bits of the second error correction circuit 152 may be 3 bits, and the maximum number of correctable error bits of the third error correction circuit 154 may be 4 bits. For example, the third error correction circuit 154 may correct 4 error bits with respect to 38-bit data and generate 28 parity bits. However, this is merely an example for convenience of explanation, and the error correction capability of the third error correction circuit 154 is not limited thereto.

The third error correction circuit 154 may be used to back up data stored in the mapping memory 153. The operation of the third error correction circuit 154 will be described later in more detail with reference to FIG. 13.

Figure 13:
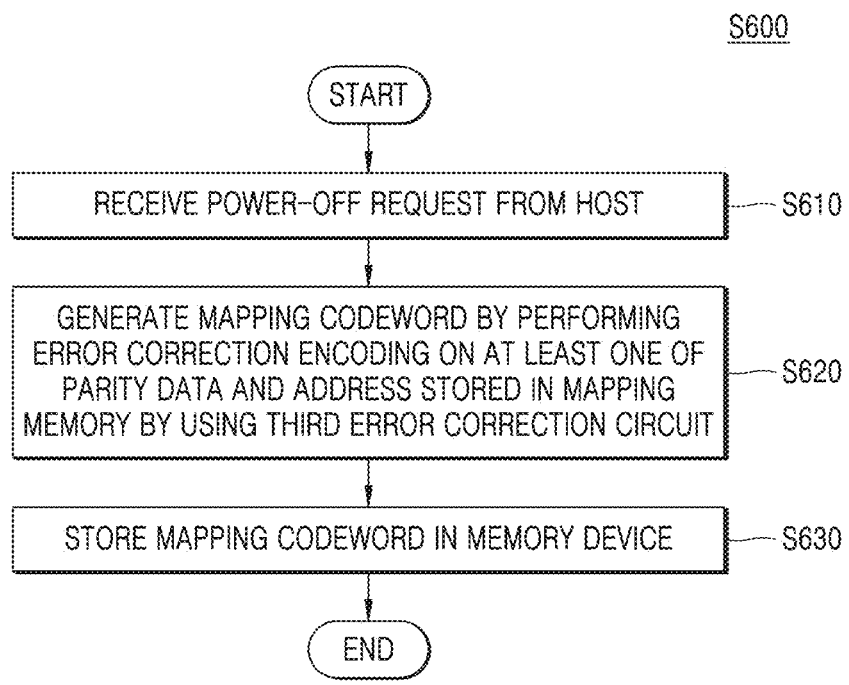
FIG. 13 is a flowchart of a method of operating a third error correction circuit according to some example embodiments.

FIG. 13 is a flowchart of a method of operating a third error correction circuit according to some example embodiments. In detail, FIG. 13 is a flowchart for describing a method of backing up data stored in the mapping memory 153 when the storage device 120a is powered off. Hereinafter, descriptions are given with reference to FIGS. 4, 8, 9, and 12.

Referring to FIG. 13, a method S600 in which the controller 140a backs up the mapping memory 153 may include operations S610 to S630.

In operation S610, the control block 142 may receive a power-off request from the host 110 through the host interface 141. Alternatively, the control block 142 may detect a power-off state of the storage device 120a. In this case, the data storage state of the storage device 120a may be the same as the state described with reference to FIG. 4.

In operation S620, the control block 142 may control the third error correction circuit 154 to perform error correction encoding on at least one of an address and parity data stored in the mapping memory 153. Hereinafter, data to be subjected to error correction encoding by the third error correction circuit 154 from among an address and parity data stored in the mapping memory 153 may be referred to as 'mapping data', and parity data generated as the third error correction circuit 154 performs error correction encoding on the mapping data may be referred to as 'mapping parity data'. The third error correction circuit 154 may perform error correction encoding on mapping data, thereby generating a mapping codeword including the mapping data and mapping parity data.

For example, the control block 142 may define an address stored in the mapping memory 153 and parity data corresponding to the address as the 'mapping data'. For example, the mapping data may include the second address A2 and the parity bits P2{q:r+1} corresponding to the second address A2. The third error correction circuit 154 may perform error correction encoding on the mapping data, thereby generating the mapping codeword MPCW including mapping data (for example, A2 and P2{q:r+1}) and the mapping parity bits Pa.

For example, the control block 142 may define only an address stored in the mapping memory 153 as the 'mapping data'. For example, the mapping data may refer to the second address A2. At this time, the third error correction circuit 154 may perform error correction encoding on the mapping data, thereby generating the mapping codeword MPCW including the mapping data MP_DATA and mapping parity data MP_PRT for the mapping data MP_DATA. For example, the third error correction circuit 154 may perform error correction encoding on the second address A2, thereby generating the mapping codeword MPCW including the second address A2 and the mapping parity data (for example, mapping parity bits Pa) for the second address A2.

In operation S630, the memory device 130 may store the mapping codeword at a new address. Therefore, even when the storage device 120 is powered off, data stored in the mapping memory 153 may be maintained.

For example, when the control block 142 defines an address stored in the mapping memory 153 and parity data corresponding to the address as the 'mapping data', the memory device 130 may store the mapping codeword MPCW including the mapping data MP_DATA and the mapping parity data MP_PRT at a new address. For example, the memory device 130 may store the mapping data MP_DATA including the second address A2 and the parity bits P2{q:r+1} corresponding to the second address A2 at the new first address Aa and may store the mapping parity data (for example, mapping parity bits Pa) corresponding to the mapping data MP_DATA.

For example, when the control block 142 defines only an address stored in the mapping memory 153 as the 'mapping data', the memory device 130 may store the mapping codeword MPCW and may store some of parity bits corresponding to the address stored in the mapping memory 153. For example, the memory device 130 may include the mapping codeword MPCW including the mapping data MP_DATA including the second address A2 and the mapping parity bits Pa for the second address A2 at the new first address Aa and may store some parity bits P2{q:r+1} of parity bits corresponding to the second address A2 stored in the mapping memory 153 without error correction encoding.

According to some example embodiments, the storage device 120a having high reliability may be provided by performing strong error correction decoding on data stored in the mapping memory 153 by using the third error correction circuit 154.

Figure 14:
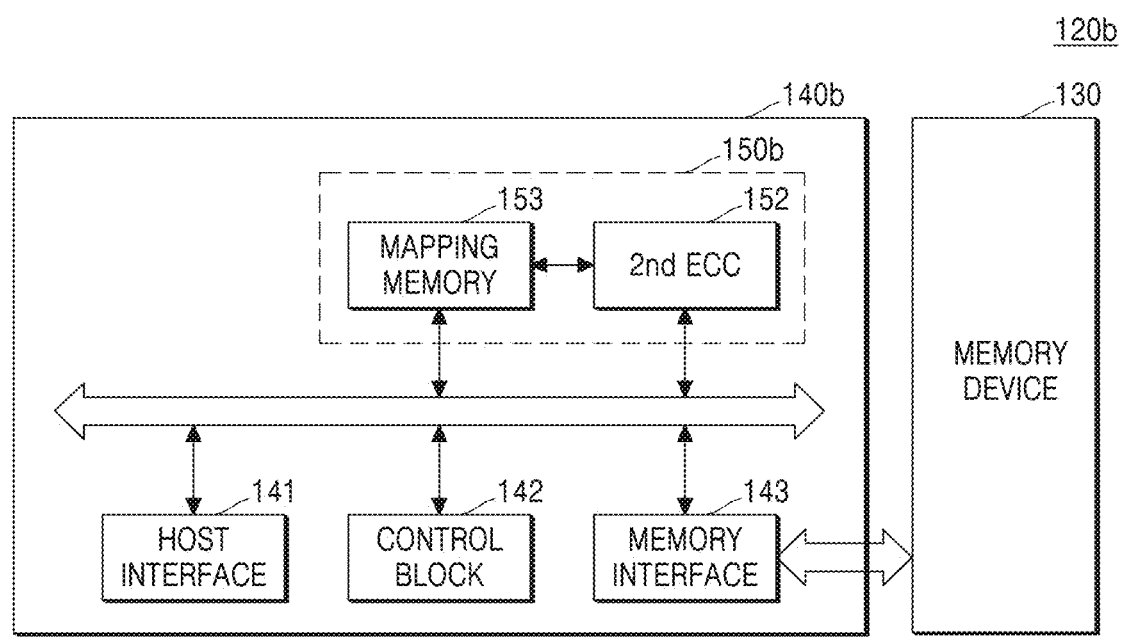
FIG. 14 is a block diagram showing a storage device according to some example embodiments.

FIG. 14 is a block diagram showing a storage device according to some example embodiments. In detail, FIG. 14 is a diagram for describing an example of the error correction circuit module 150 described above with reference to FIG. 3. Hereinafter, descriptions are given with reference to FIGS. 1 to 3, the same reference numerals may denote the same elements, and redundant descriptions will be omitted.

Referring to FIG. 14, a controller 140b may include the host interface 141, the control block 142, the memory interface 143, and an error correction circuit module 150b. However, the configuration of the controller 140b is not limited thereto, and the controller 140b may further include components not shown in FIG. 14.

The error correction circuit module 150b may include the second error correction circuit 152, and the mapping memory 153. As compared to the error correction circuit module 150 of FIG. 3, the first error correction circuit 151 may be omitted in the error correction circuit module 150b.

The second error correction circuit 152 may be used when the WER is weak. For example, as described below with reference to FIG. 15, when the controller 140b receives a write request from the host 110, a WER may be detected, and the second error correction circuit 152 may generate a codeword by performing error correction encoding on original data according to the WER. Hereinafter, the method of operating the controller 140b will be described in more detail with reference to FIG. 15.

Figure 15:
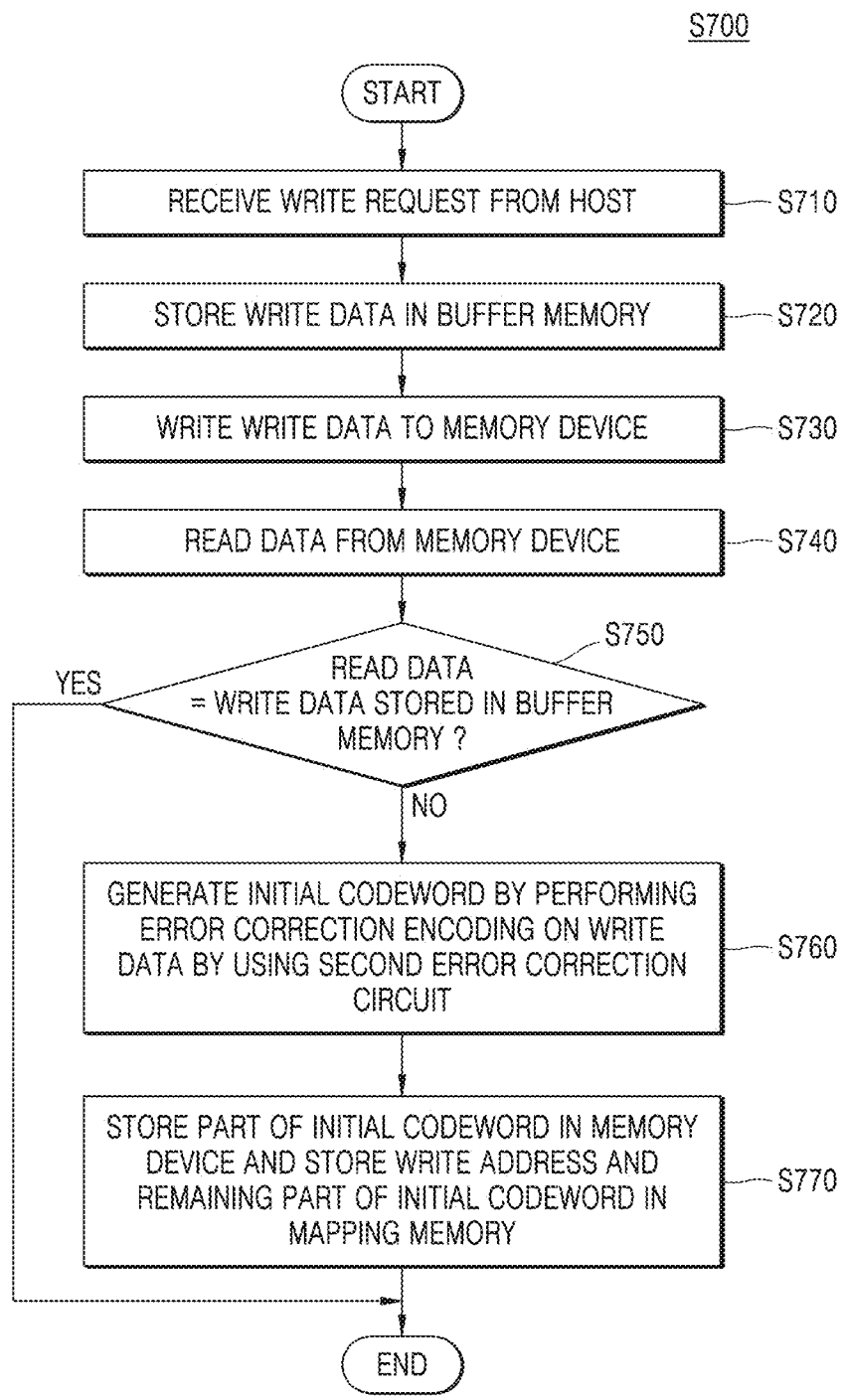
FIG. 15 is a flowchart of a data writing method of a storage device according to some example embodiments.

FIG. 15 is a flowchart of a data writing method of a storage device according to some example embodiments. In detail, FIG. 15 is a flowchart for describing a data write operation performed by the storage device 120b in response to a write request from a host. Hereinafter, FIG. 15 will be described with reference to FIG. 14.

Referring to FIG. 15, the data writing method S700 of a storage device may include operations S710 to S770.

In operation S710, the control block 142 may receive a write request and original data (for example, write data) from a host through the host interface 141.

In operation S720, the control block 142 may store the original data in a buffer memory. According to some example embodiments, the controller 140b may further include an internal memory functioning as the buffer memory. In some example embodiments, the control block 142 may use a portion of the mapping memory 153 as the buffer memory. The control block 142 may store the original data received together with the write request in the buffer memory for comparison with data read from the memory device 130 in operation S750 to be described below.

In operation S730, the control block 142 may write the original data to the memory device 130, and in operation S740, the control block 142 may read data corresponding to the original data from the memory device 130. Data read from the memory device 130 in operation S740 may include an error, and thus the data read from the memory device 130 in operation S740 may be different from the original data stored in the buffer memory in operation S720.

In operation S750, the control block 142 may compare the read data with the original data stored in the buffer memory. When the read data and the original data stored in the buffer memory are the same (e.g., when no error occurs), as shown in FIG. 15, the data writing method S700 of FIG. 15 may be terminated. Therefore, a state in which the original data on which error correction encoding is not performed is stored in the memory device 130 may be maintained.

When the read data and the original data stored in the buffer are different from each other (e.g., they are not identical), the second error correction circuit 152 may generate an error corrected codeword by performing error correction encoding on the original data in operation S760. In other words, it may be detected whether an error occurs by writing the original data to the memory device 130 or reading the data corresponding to the original data from the memory device 130, and, when an error occurs, error correction encoding may be performed by the second error correction circuit 152. Therefore, unnecessary error correction encoding may be omitted.

In operation S770, the control block 142 may control the mapping memory 153 and the memory device 130, such that a part of the error corrected codeword generated by the second error correction circuit 152 is stored in the memory device 130 and an address and the remaining of the error corrected codeword are stored in the mapping memory 153.

Figure 16:
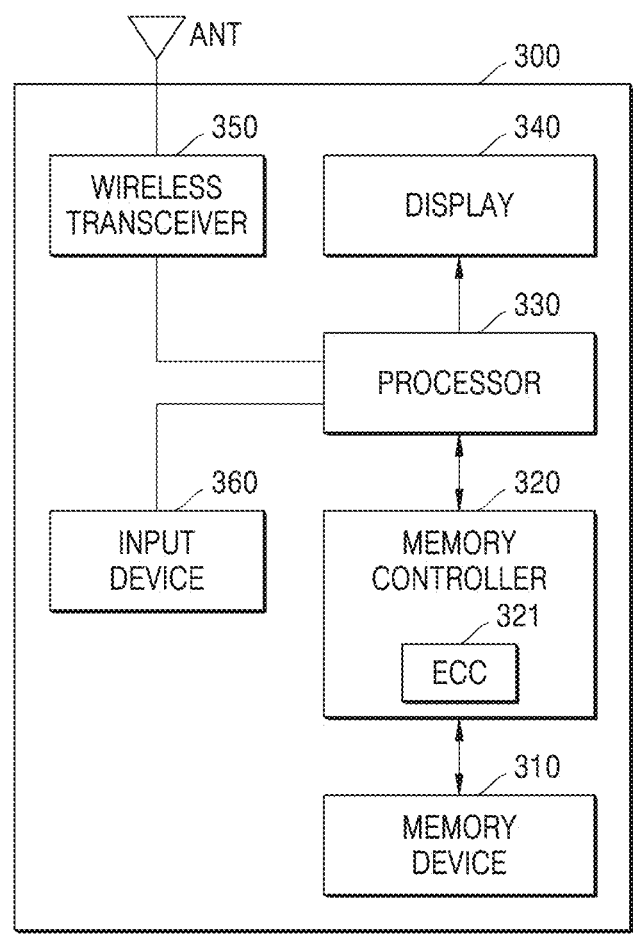
FIG. 16 is a diagram showing a memory system according to some example embodiments.

FIG. 16 is a diagram showing a memory system according to some example embodiments. In detail, FIG. 16 is a diagram showing another example embodiment of a memory system including at least one of controllers 140, 140a, and 140b shown in FIGS. 1, 12, and 14.

Referring to FIG. 16, a memory system 300 may be implemented as a cellular phone, a smartphone, a tablet, a personal computer (PC), a PDA, a wireless communication device, or the like. The memory system 300 may include a memory device 310 and a memory controller 320 capable of controlling the operation of the memory device 310. The memory device 310 may correspond to the memory device 130 of FIG. 1.

The memory controller 320 may control a data access operation, e.g., a program operation, an erase operation, or a read operation, of the memory device 310 under control by a processor 330. The memory controller 320 may correspond to the controller 140 of FIG. 1. The memory controller 320 may include an error correction circuit (ECC) 321. The error correction circuit 321 may correspond to one of error correction circuit modules 150, 150a, and 150b of FIGS. 2, 12, and 13. Therefore, the memory system 300 exhibiting high reliability may be provided. According to some example embodiments, the memory controller 320 may be implemented as a part of the processor 330 or as a chip separate from the processor 330.

The processor 330 may process a signal output from a wireless transceiver 350 and transmit a processed signal to the memory controller 320 or a display 340. The processor 330 may control the display 340, such that data output from the memory controller 320, data output from the wireless transceiver 350, or data output from an input device 360 may be output through the display 340. The processor 330 may correspond to the host 110 of FIG. 1.

The display 340 may output data output from the memory controller 320, data output from the wireless transceiver 350, or data output from the input device 360 under control by the memory controller 320.

The wireless transceiver 350 may transmit and receive wireless signals through an antenna ANT. For example, the wireless transceiver 350 may change a wireless signal received through the antenna ANT into a signal that may be processed by the processor 330. Also, the wireless transceiver 350 may change a signal output from the processor 330 into a wireless signal and output a changed wireless signal to an external device through the antenna ANT.

The input device 360 may receive a control signal for controlling the operation of the processor 330 or data to be processed by the processor 330. For example, the input device 360 may be implemented as a pointing device like a touch pad and a computer mouse, a keypad, or a keyboard.

Figure 17:
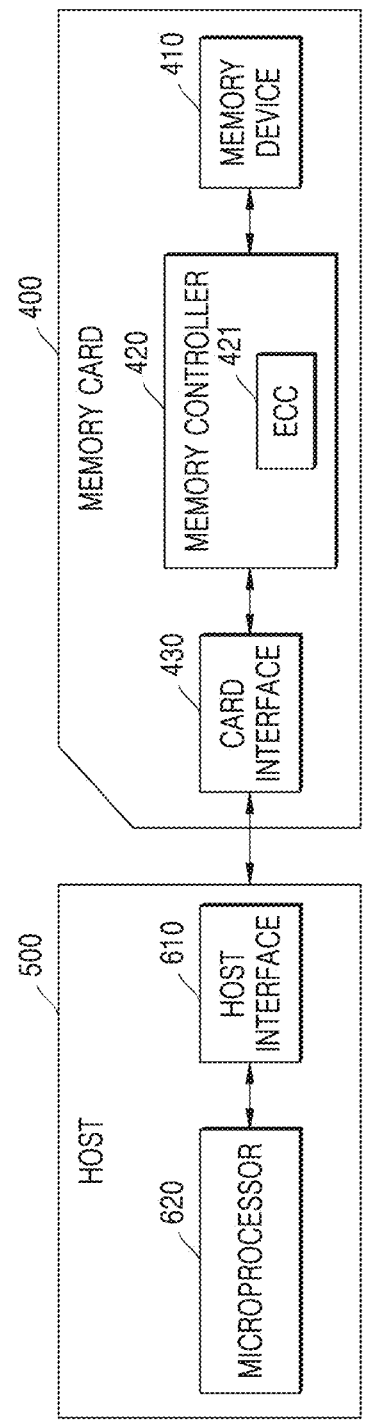
FIG. 17 is a diagram showing a memory system according to some example embodiments.

FIG. 17 is a diagram showing a memory system according to some example embodiments. In detail, FIG. 17 is a diagram showing another example embodiment of a memory system including at least one of controllers 140, 140a, and 140b shown in FIGS. 1, 12, and 14.

Referring to FIG. 17, a memory system 400 may be implemented as a memory card or a smart card. The memory system 400 may include a memory device 410, a memory controller 420, and a card interface 430.

The memory controller 420 may control data exchange between the memory device 410 and the card interface 430. The memory device 410 may correspond to the memory device 130 of FIG. 1, and the memory controller 420 may correspond to the controller 140 of FIG. 1. The memory controller 420 may include an error correction circuit (ECC) 421. The error correction circuit 421 may correspond to one of error correction circuit modules 150, 150a, and 150b of FIGS. 2, 12, and 13. Therefore, the memory system 400 exhibiting high reliability may be provided.

The card interface 430 may interface data exchanges between a host 500 and the memory controller 420 according to a protocol of the host 500. According to some example embodiments, the card interface 430 may support a USB protocol and an InterChip (IC)-USB protocol. The card interface 430 may refer to hardware capable of supporting a protocol used by the host 500 and software or a signal transmission method installed on the hardware. The card interface 430 may include, but is not limited to, an SD card interface or an MMC interface.

When the memory system 400 is connected to a host interface 610 of the host 500 like a PC, a tablet, a digital camera, a digital audio player, a mobile phone, console video game hardware, or a digital set-top box, the host interface 610 may perform data communication with the memory device 410 through the card interface 430 and the memory controller 420 under control by a micro-processor 620.

The memory system 100 (or other circuitry, for example, the host 110, storage device 120, memory device 130, controller 140, ECC module 150, first error correction circuit 151, second error correction circuit 152, mapping memory 153, third error correction circuit 154, host interface 141, control block 142, and memory interface 143, as well as the memory system 300, memory system 400, host 500, and associated sub-components, and the variations thereof discussed above) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A storage device comprising:
a memory device configured to store original data; and
a controller configured to control the memory device, the controller including
a first error correction circuit configured to correct an error of the original data;
a second error correction circuit configured to correct an error of the original data, a maximum number of correctable error bits of the second error correction circuit being greater than a maximum number of correctable error bits of the first error correction circuit;
a mapping memory configured to store at least some of parity bits generated by the second error correction circuit and store an address of the memory device at which the original data is stored;
a control block configured to
control the first error correction circuit, the second error correction circuit, and the mapping memory;
wherein, based on a write request or a read request being received from outside of the storage device, the control block is further configured to check whether a write address or a read address is identical to an address of the memory device stored in the mapping memory and select one of the first error correction circuit and the second error correction circuit to perform error correction encoding or error correction decoding.

2. The storage device of claim 1, wherein the control block is further configured to
read the original data stored in the memory device, and
select one of the first error correction circuit and the second error correction circuit to perform error correction encoding on the original data based on a number of error bits of the original data.

3. The storage device of claim 1, wherein the mapping memory is configured to store an address of the memory device at which the original data is stored and all of parity bits generated by the second error correction circuit.

4. The storage device of claim 1, wherein, based on the write address being identical to the address of the memory device stored in the mapping memory, the control block is further configured to select the second error correction circuit to perform error correction encoding on data, which is included in the write request.

5. The storage device of claim 1, wherein
the second error correction circuit is further configured to generate mapping parity data for mapping data comprising the parity bits and an address of the memory device stored in the mapping memory by performing error correction encoding on the mapping data, and
the control block is further configured to control the memory device to store the mapping data and the mapping parity data.

6. The storage device of claim 1, wherein
the second error correction circuit is further configured to generate mapping parity data for mapping data comprising an address of the memory device by performing error correction encoding on the mapping data, and
the control block is configured to control the memory device to store the mapping data, the mapping parity data, and the parity bits stored in the mapping memory.

7. The storage device of claim 1, wherein the control block is further configured to store an address and parity bits stored in the mapping memory in the memory device.

8. The storage device of claim 1, wherein the controller further comprises a third error correction circuit configured to correct an error of data stored in the mapping memory and having a greater maximum number of correctable error bits than the second error correction circuit.

9. A storage device comprising:
a memory device configured to store a codeword comprising original data and parity bits for the original data;
an error correction circuit module configured to generate the codeword by encoding the original data,
wherein the error correction circuit module comprises
a first error correction circuit;
a second error correction circuit having a greater maximum number of correctable error bits than the first error correction circuit; and
a mapping memory configured to store a part of the codeword generated by the second error correction circuit and an address of the memory device at which the original data is stored;
wherein, based on the storage device receiving a write request or a read request and a write address or a read address being identical to an address stored in the mapping memory, the second error correction circuit is further configured to perform error correction encoding or error correction decoding on original data subjected to the write request or the read request.

10. The storage device of claim 9, wherein error correction encoding is performed on the original data by the first error correction circuit or the second error correction circuit based on a number of error bits in the original data.

11. The storage device of claim 9, wherein
the second error correction circuit is further configured to generate a mapping codeword comprising mapping parity data by performing error correction encoding on a part of the codeword and an address stored in the mapping memory, and
the memory device is configured to store the mapping codeword.

12. The storage device of claim 9, wherein
the second error correction circuit is further configured to generate a mapping codeword comprising mapping parity data by performing error correction encoding on an address of the memory device, and
the mapping codeword and the part of the codeword stored in the mapping memory are stored in the memory device.

13. The storage device of claim 9, wherein memory device is configured to stores the address and the part of the codeword stored in the mapping memory.

14. A method of operating a storage device, the method comprising:
receiving a write request and original data from outside the storage device, the storage device including a memory device;
checking whether an address corresponding to the write request is identical to an address stored in a mapping memory;
generating parity bits by performing error correction encoding on the original data by using a first error correction circuit, based on the address corresponding to the write request being different from the address stored in the mapping memory;
storing the original data and the parity bits generated by the first error correction circuit in the memory device;
generating parity bits by performing error correction encoding on the original data by using a second error correction circuit, based on the address corresponding to the write request being identical to the address stored in the mapping memory; and
storing the original data and some of the parity bits generated by the second error correction circuit in the memory device and storing the address corresponding to the write request and remaining parity bits generated by the second error correction circuit in the mapping memory,
wherein a maximum number of correctable error bits of the second error correction circuit is greater than that of the first error correction circuit.

15. The method of claim 14, further comprising:
reading data stored in the memory device;
determining a number of error bits in the read data by performing error correction decoding on the read data; and
performing error correction encoding on the original data by using the second error correction circuit based on the number of error bits in the original read data being greater than a reference value.

16. The method of claim 15, wherein the reference value is equal to a maximum number of correctable error bits of the first error correction circuit.

17. The method of claim 14, further comprising:
receiving a power-off request;
generating a mapping codeword by performing error correction encoding on an address and parity bits stored in the mapping memory; and
storing the mapping codeword in the memory device.

18. The method of claim 14, further comprising:
receiving a power-off request;
generating a mapping codeword by performing error correction encoding on an address stored in the mapping memory; and
storing, in the memory device, the parity bits and the mapping codeword stored in the mapping memory and the mapping codeword in the mapping memory.

* * * * *